(12) United States Patent
Beck et al.

(10) Patent No.: US 10,045,513 B2
(45) Date of Patent: Aug. 14, 2018

(54) CRANIAL PROTECTION SYSTEM FOR A TERRESTRIAL ANIMAL

(71) Applicants: Derek Beck, Portland, OR (US); Brian Behrens, Portland, OR (US)

(72) Inventors: Derek Beck, Portland, OR (US); Brian Behrens, Portland, OR (US)

( * ) Notice: Subject to any disclaimer, the term of this patent is extended or adjusted under 35 U.S.C. 154(b) by 62 days.

(21) Appl. No.: 15/368,399

(22) Filed: Dec. 2, 2016

(65) Prior Publication Data
US 2017/0156291 A1    Jun. 8, 2017

Related U.S. Application Data

(60) Provisional application No. 62/263,028, filed on Dec. 4, 2015.

(51) Int. Cl.
*A01K 13/00*    (2006.01)

(52) U.S. Cl.
CPC .................. *A01K 13/006* (2013.01)

(58) Field of Classification Search
CPC ............ A01K 13/006; B68C 5/00; B68B 7/00
USPC ....... 119/814, 850; 54/80.1, 80.5, 80.2, 80.3
See application file for complete search history.

(56) References Cited

U.S. PATENT DOCUMENTS

| | | | | |
|---|---|---|---|---|
| 4,040,239 A * | 8/1977 | Powell | ................. | A01K 13/006 119/850 |
| 4,756,145 A * | 7/1988 | Pelling | ................. | A01K 13/006 119/850 |
| 5,321,937 A * | 6/1994 | Hamilton | ............. | A01K 13/006 54/80.2 |
| 5,341,627 A * | 8/1994 | Eby | ...................... | A01K 13/007 119/654 |
| 5,456,215 A * | 10/1995 | Deutscher | ............ | A01K 13/006 119/850 |
| 5,713,188 A * | 2/1998 | Chisholm | ............ | A01K 13/006 54/80.1 |
| 8,539,913 B2 * | 9/2013 | Caputo | .................. | A01K 15/02 119/850 |
| 8,763,562 B2 * | 7/2014 | Fladl | .................. | A41D 13/1245 119/850 |
| 2007/0084156 A1 * | 4/2007 | Andrews | .............. | A01K 13/006 54/80.1 |
| 2008/0121193 A1 * | 5/2008 | Stampoultzis | ....... | A01K 13/006 119/850 |
| 2010/0043725 A1 * | 2/2010 | Hall | ..................... | A01K 13/006 119/850 |
| 2010/0307427 A1 * | 12/2010 | Mann | .................. | A01K 13/006 119/850 |

* cited by examiner

*Primary Examiner* — Trinh T Nguyen
(74) *Attorney, Agent, or Firm* — Mohr Intellectual Property Law Solutions, PC

(57) ABSTRACT

A cranial protection system for a terrestrial animal, the protection system Cranial protectors, including cranial protection systems for terrestrial animals are described herein. In some examples, the system includes plates and panels that work in concert. In some further examples the system includes a face shield. In still some further examples, the system is configured to work with accessories such as audio visual transmitters and oxygen masks.

17 Claims, 5 Drawing Sheets

CRANIAL PROTECTION SYSTEM FOR A TERRESTRIAL ANIMAL

CROSS REFERENCE TO RELATED APPLICATIONS

This application claims priority to U.S. Application Ser. No. 62/263,028 filed on 4 Dec. 2015, which is hereby incorporated by reference for all purposes.

BACKGROUND

The present disclosure relates generally to helmets. In particular, helmets for service and companion animals, namely dogs, are described. Known animal helmets are not entirely satisfactory for the range of applications in which they are employed. This is particularly surprising as dogs are used in many dangerous activities in ever-increasing numbers. These dangerous activities include sensing bombs or other explosives, searching for contraband by civilian police forces, scrambling over unstable debris after a natural disaster in search of human survivors, and other activities that place the animal in harm's way.

Companion and service animals are not immune to danger. As the use of animal companions, service animals, and pet ownership continues to rise, more and more of these animals are finding themselves engaging in activities that go well beyond what is typical for a domesticated (albeit highly trained) animal. These animals frequently suffer serious injury and even death due to blunt-force trauma that might occur should an accident befall them. Additionally, these activities expose the animal's eyes to flying debris. Thus, there is a great need for specially designed helmets with different applications of use and helmets that are uniquely tailored for the type of activity encountered by the animal. These activities, whether military, civilian policing, or adventurous companion animals, require special fitment for comfort for the animal and need to provide eye protection.

There is a significant need for a protective device, such as a helmet, for both companion and service animals, particularly dogs. Such a device should be comfortable for the animal to wear and further protect the head of the animal from blunt force trauma and the eyes from foreign objects, such as those that might be encountered by service animals working as law enforcement canine units, search and rescue dogs, or for companion dogs that participate in robust exercises and travel with their handlers on motorcycles, all-terrain vehicles, bicycles, and the like.

The known art is all but void of protective gear for the head area of canines. In addition, known protective head gear for service and companion animals is surprisingly inefficient for the uses for which it is employed. For example, existing helmets do not contemplate use with different breeds and/or sizes of dogs, let alone different species of animals. In addition, conventional helmets are uncomfortable and do not contemplate the unique shape of the animal's head, particularly in terms of snout and ear placement. This impairs the animal's vision and hearing when the helmet is in use, which can actually increase the risk of harm to the animal.

Thus, there exists a need for cranial protection systems that improve upon and advance the design of known systems. Examples of new and useful cranial protection relevant to the needs existing in the field are discussed below.

Disclosure addressing one or more of the identified existing needs is provided in the detailed description below. Examples of references relevant to animal helmets include U.S. Patent References: U.S. Pat. App. No. 2007/0084156 U.S. Pat. No. 4,040,239 U.S. Pat. No. 5,713,188. The complete disclosures of the above patents and patent applications are herein incorporated by reference for all purposes.

SUMMARY

The present disclosure is directed to cranial protection systems for terrestrial animals. It provides a protective helmet for terrestrial animals, namely dogs. It includes a hard-shell outer layer having a unique multi component design with pliant panels disposed between the hard-shell components and a soft inner layer. In some embodiments, the system may be equipped with eye protection. In still other embodiments, the system may be configured to send and receive audio and/or visual transmissions. Other features and functions will be better appreciated in context with the detailed description and figures.

DETAILED DESCRIPTION

The disclosed cranial protection system will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various helmets are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The present invention provides a protective helmet for terrestrial animals, namely dogs and other service or companion animals. This invention is ideally suited for animals employed in explosive detection, search and rescue, drug detection, fugitive tracking, accelerant detection, criminal apprehension, search and recovery, military purposes including parachute drops into hostile territory, or other working endeavors, and for companion animals for individuals that have active recreational lives that might include riding in open-top cars, motorcycles, bicycles, all-terrain vehicles or other forms of rough play or recreation.

With reference to FIGS. 1-7, a first example of a cranial protection system, helmet 100, will now be described. Helmet 100 functions to protect a terrestrial animal's head while it is engaged in activities that could place it in harm's way. The reader will appreciate from the figures and description below that helmet 100 addresses shortcomings of conventional cranial protection systems for animals.

For example, helmet 100 contemplates use with different breeds and/or sizes of dogs and different species of animals by being customizable and comprising moving parts that can be fitted to the animal's head. Further, helmet 100 is created out of negative space to maximize movement, comfort, and to facilitate the animal's ability to see and hear when the helmet is being worn.

Figure 1:
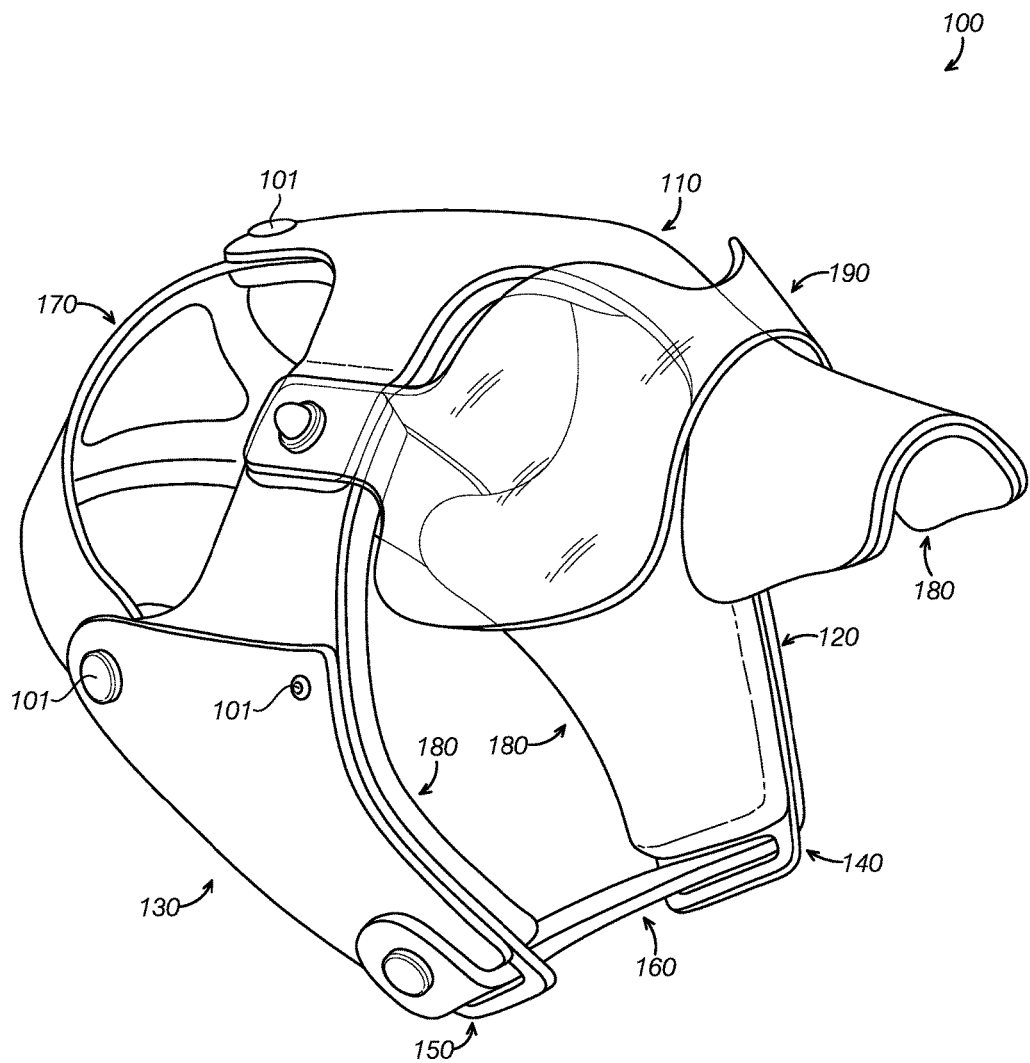
FIG. 1 is a perspective view of a first example of a cranial protection system.

As can be seen in FIG. 1, helmet 100 includes a face guard 110, a left plate 120, a right plate 130, a left panel 140, a right panel 150, a front strap 160, a rear strap 170, and a plurality of cushioning means 180. In the present embodiment, left plate 120 and right plate 130 comprise a hard-shell outer while left panel 140 and right panel 150 comprise a flexible layer disposed between the panels and the plurality of cushioning means 180. FIG. 1 also depicts front shield 190 (discussed in further detail in FIG. 3). It is to be understood that front shield 190 is optional and may be removed and attached according to the user's needs. Finally, helmet 100 comprises a plurality of fasteners 101. The reader will appreciate that, according to FIG. 1, plurality of fasteners 101 comprises studs and is by way of example only. It should be understood that it is an object of the present invention that, in alternative embodiments, plurality of fasteners may comprise screws, nails, pegs, brads, and other types of fasteners suitable to securely connect the components of helmet 100 to one another.

Similarly, in the present embodiment, left plate 120 and right plate 130 comprise a solid, inflexible material such as polycarbonate plastic, however, it is to be understood that the plates may be made of hard material such as fiberglass, polymers and copolymers, metals and metal alloys, or any other material suitable for providing a hard outer shell. Also in the present embodiment, left panel 140 and right panel 150 comprise a sturdy pliant material such as rubber, however, it is an object of the present invention that the panels may be made of any sturdy and flexible material, including polymers and copolymers, sturdy fabrics, and the like. Finally, in the present embodiment, each of the plurality of cushioning means 180 comprises a soft material such as foam rubber, however, the reader will appreciate that the cushioning means may comprise any soft material suitable to prevent chafing and increase comfort to the wearer, such as cloth, polymer and copolymer foam, or any soft pliant material suitable for such purpose.

Figure 2:
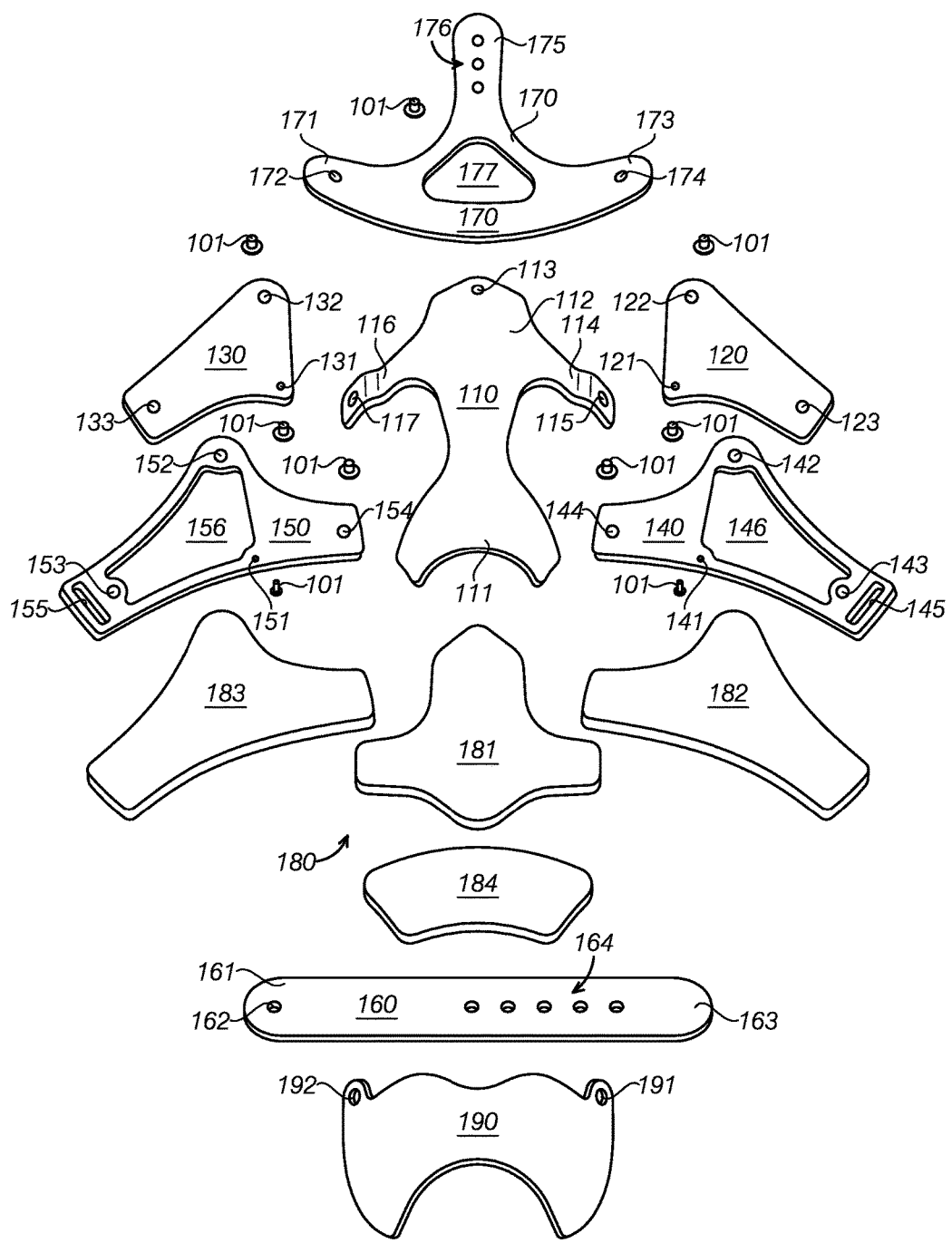
FIG. 2 is an exploded view of the cranial protection system shown in FIG. 1.

Turning attention to FIG. 2, an exploded view of the components of helmet 100 is shown and described. As can be seen, helmet 100 comprises a face guard 110 having a nose guard 111, a head guard 112 further comprising a head guard aperture 113, a left panel band 114 further comprising a left panel band aperture 115, and a right panel band 116 further comprising a right panel band aperture 117. Helmet 100 also comprises a left plate 120 and a right plate 130, wherein the left plate 120 comprises a left plate proximal aperture 121, a left plate distal aperture 122, and a left plate lower aperture 123 and wherein the right plate 130 comprises a right plate proximal aperture 131, a right plate distal aperture 132, and a right plate lower aperture 133.

Also shown in FIG. 2 are a left panel 140 and a right panel 150. Left panel 140 comprises a left panel proximal aperture 141, a left panel distal aperture 142, and a left panel lower aperture 143. Left panel 140 further comprises a left panel face guard aperture 144, a left panel slot 145, and a left panel opening 146. Similarly, right panel 150 comprises a right panel proximal aperture 151, a right panel distal aperture 152, and a right panel lower aperture 153. Right panel further comprises a right panel face guard aperture 154, a right panel slot 155, and a right panel opening 156. The reader will appreciate that the shape of the plates and location of the respective apertures on each is complimentary and corresponds to the shape of the panels and locations of their respective apertures. In this manner, the components of helmet 100 work in concert to assemble into a complete cranial protection system for the animal's head. The reader will also appreciate that the shape and dimensions of the left and right panel slots (145, 155) are complimentary to the shape and dimensions of front strap 160. In this manner, front strap 160 may be removably threaded through left panel slot and right panel slot (145, 155) to secure helmet 100 under the wearer's chin (discussed in further detail below). The reader will appreciate that the present attaching mechanism of front strap 160 is by way of example only. It should be understood that it is an object of the present invention that other suitable attaching means may be employed without departing from the scope of the invention. Thus, in alternative embodiments front strap 160 may comprise any number of fastening means suited to the purpose of tightening front strap 160 under the chin of the animal, such a ladder strap paired with a ratchet buckle, traditional buckles, clasps, snaps, cams, loops, rings, and the like.

Turning attention to the plurality of cushioning means 180 mentioned in FIG. 1, as can be seen, FIG. 2 depicts the plurality of cushioning means 180 to comprise a head cushioning means 181, a left panel cushioning means 182, a right panel cushioning means 183, and a nose cushioning means 184. It is to be understood that, as alluded to above, the shape of each of the plurality of cushioning means 180 is complimentary to the structure it is affixed to. In the present embodiment, each of the plurality of cushioning means 180 is affixed to a corresponding component of helmet 100. Thus, as can be seen, the present embodiment depicts head cushioning means 181 affixed to the underside of face guard 110, nose cushioning means 184 is affixed to the underside of nose guard 111, left panel cushioning means 182 is affixed to the underside of left panel 140, and right panel cushioning means is affixed to the underside of right panel 150 as shown. It is contemplated within the present invention that the plurality of cushioning means may differ in size, shape, number, and location according to the unique physiology of the animal wearing helmet 100. Thus, in alternative embodiments (not shown) plurality of cushioning means 180 may be configured differently. It is to be understood that the purpose of the plurality of cushioning means is to function as a barrier between the animal's body and the plates and panels of helmet 100 (described in further detail below).

FIG. 2 also illustrates a front strap 160 and a rear strap 170. As can be seen, front strap 160 comprises a band having a front strap right side 161 with a front strap right side aperture 162 and a front strap left side 163 with a plurality of front strap left side apertures 164 as shown. Similarly, rear strap 170 comprises a rear strap right side 171 having a rear strap right side aperture 172, a rear strap left side 173 having a rear strap left side aperture 174, a rear strap band 175 having a plurality of rear strap band apertures 176, and a rear strap opening 177. Finally, FIG. 2 depicts front shield 190 having a left face guard aperture 191 and a right face guard aperture 192.

With reference to the embodiments of helmet 100 as shown in FIGS. 1, 3, 4, and 5, then, the reader will appreciate that the components of a preferred embodiment of helmet 100 may be assembled in the following manner. In the present embodiment, the plurality of cushioning means is affixed to its corresponding component of helmet 100 via a strong adhesive, however, in alternative embodiments, other suitable means may be employed to permanently join each cushioning means to its counterpart. As mentioned above, each of said plurality of cushioning means 180 is affixed to its corresponding component of helmet 100. Thus, as can be seen in the present embodiment and FIGS. 1 and 4 in particular, left panel cushioning 182 means is affixed to left side panel 140 such that a portion of left panel cushioning means 182 is exposed via left panel opening 146. Similarly, right panel cushioning 183 means is affixed to right panel 150 such that a portion of right panel cushioning means 183 is exposed via right panel opening 156. As mentioned above, nose cushioning means 184 is affixed to the underside of nose guard 111 and head cushioning means 181 is affixed to the underside of head guard 112. In this manner, face guard 110 substantially covers nose cushioning means 184 and head cushioning means 181 to create a protective multilayered configuration that functions as the top component of helmet 100

Left plate 120 is affixed to left panel 140 by aligning left plate proximal aperture 121 with left panel proximal aperture 141, aligning left plate distal aperture 122 with left panel distal aperture 142, aligning left plate lower aperture 123 with left panel lower aperture 143, and securing left plate 120 to left panel 140 with a fastener 101 inserted through each of the above referenced apertures. In this manner, left plate 120 substantially covers left cushioning means 182 and left panel opening 146 to create a protective multilayered configuration that functions as the left side component of helmet 100. Similarly, right plate 130 is affixed to right panel 150 by aligning right plate proximal aperture 131 with right panel proximal aperture 151, aligning right plate distal aperture 132 with right panel distal aperture 152, aligning right plate lower aperture 133 with right panel lower aperture 153, and securing right plate 130 to right panel 150 with a fastener 101 inserted through each of the above referenced apertures. In this manner, right plate 130 substantially covers right cushioning means 183 and right panel opening 156 to create a protective multilayered configuration that functions as the left side component of helmet 100.

Referring again to face guard 110, rear strap 170 is aligned with face guard 110 such that rear strap band 175 is positioned substantially over the back of the animal's head, with rear strap right side 171 curving frontwardly toward the right side of the animal's face and rear strap left side 173 curving frontwardly toward the left side of the animal's face. Rear strap 170 is then affixed to face guard 110 by aligning one of said rear strap band apertures 176 with head guard aperture 113 and inserting one of said plurality of fasteners 101 through head guard aperture 113 and said rear strap aperture 176. In this manner, rear strap opening 177 is positioned substantially between rear strap left side 173 and rear strap right side 171 and one of said rear strap band apertures 176 is positioned on top of the animal's head. In this manner, rear strap 170 is customizable to the unique physiology of the animal and at the same time functions as the back of helmet 100 to maximize flexibility and comfort.

In the present embodiment, rear strap 170 is customizable and capable of accommodating the different types of animals that might wear the helmet. In this manner, rear strap 170 includes features to selectively loosen and tightens to accommodate different shapes and sizes of heads. The reader will appreciate that the present attaching mechanism of rear strap 170 is by way of example only. It should be understood that it is an object of the present invention that other suitable attaching means may be employed without departing from the scope of the invention. Thus, in alternative embodiments rear strap 170 may comprise any number of fastening means suited to the purpose of tightening rear strap 170, such a ladder strap paired with a ratchet buckle, traditional buckles, clasps, snaps, cams, loops, rings, and the like.

Finally, left panel 140 is affixed to face guard 110 by aligning left panel face guard aperture 144 with left panel band aperture 115 and securing the two together with fastener 110. Similarly, right panel 150 is affixed to face guard 110 by aligning right panel face guard aperture 154 with right panel band aperture 117 and securing the two together with fastener 110. Thus, when assembled, the components create negative space though which the animal's ears may fit though. In this manner, helmet provides a safe and comfortable wearing experience for the animal (shown in further detail in FIG. 6).

Figure 3:
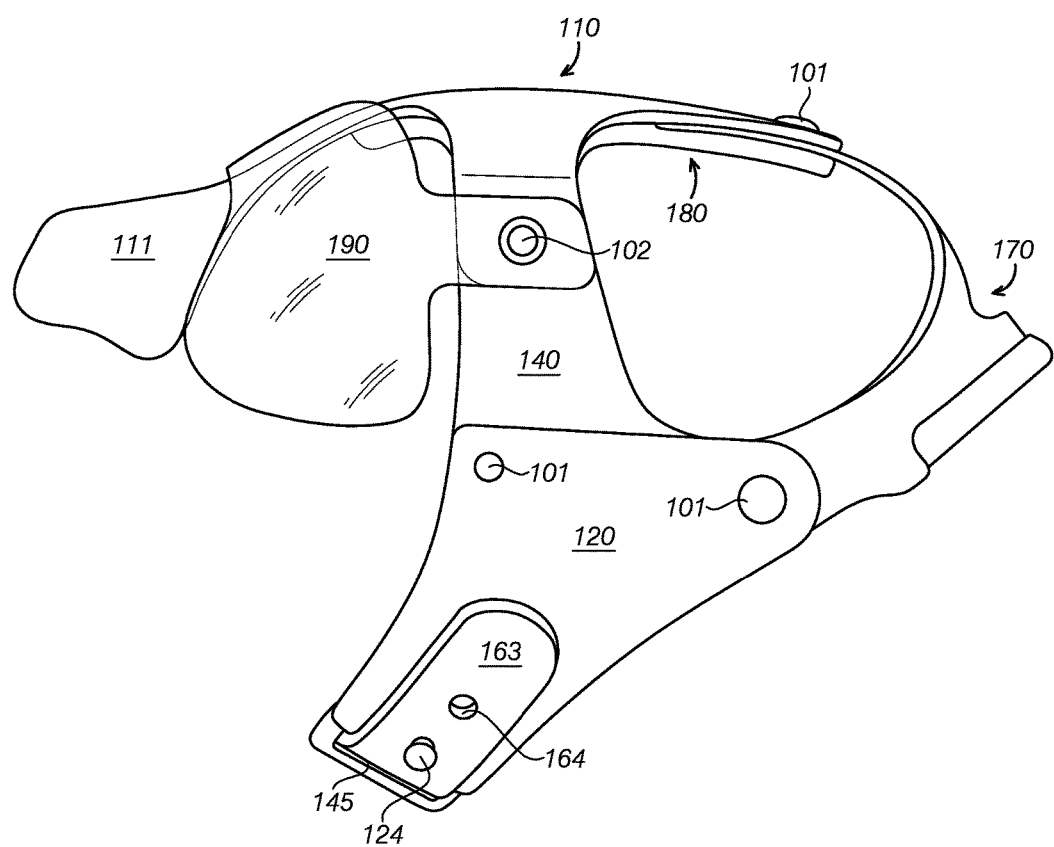
FIG. 3 is a left side view of the cranial protection system according to an embodiment of the present invention.
Figure 4:
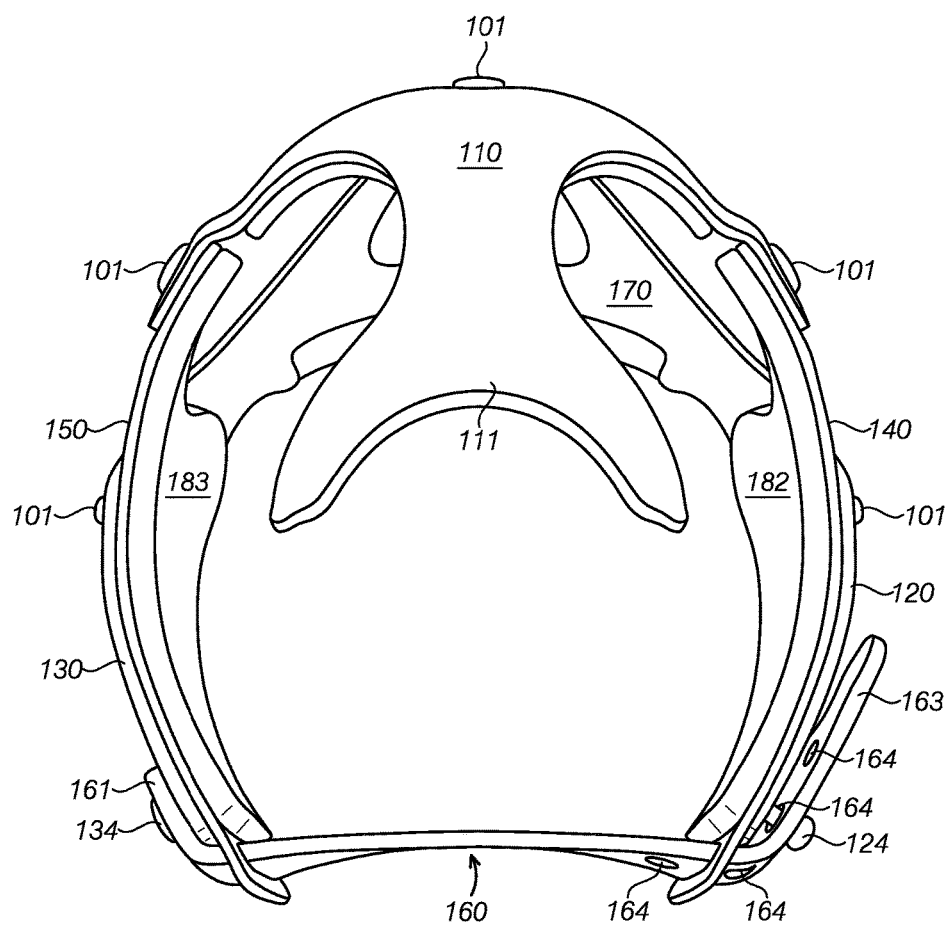
FIG. 4 is a front view of the cranial protection system according to an embodiment of the present invention.

Turning attention to FIGS. 3 and 4, front and left side views of helmet 100 as assembled are shown and described. The present figures depict different views of helmet 100 as it would be worn by the animal when in use. Thus, when helmet 100 has been assembled in the manner described in the preceding figures, face guard 110 is positioned over where top of the animal's head would be with nose guard 111 positioned over the top of where the animal's snout or nose would be. As can be seen in FIG. 3, the present embodiment of helmet 100 includes front shield 190 that is removably coupled to face guard 110 (also shown in FIG. 1). In this manner, front shield 190 rests substantially over nose guard 111 thus creating protective shields over the left and right side of the animal's face where its eyes are located. As can be seen, front shield 190 may be affixed to face guard with a grommet 102 on either side of face guard 110, however, the reader will appreciate that it is an object of the present invention that any suitable attaching means may be employed. For the sake of clarity, front shield 190 is not shown in FIG. 4

The present figures illustrate left plate 120 further comprising left plate peg 124 and right plate 130 further comprising right plate peg 134. As can be seen, front strap 160 has been attached to right plate 130 by threading front strap right side 161 through right panel slot 155 and securing it to right plate 130 with right plate peg 134. In order to securely place helmet 100 on the animal's head, front strap 160 is positioned under the animal's chin and removably coupled to left plate 120 by threading front strap left side 163 through left panel slot 145 and securing it in place by inserting left plate peg 124 though one of said plurality of front strap left side apertures 164. As can be seen, the dimensions of left plate peg 124 are complimentary to the dimensions of the plurality of front strap apertures 164. In this manner, front strap 160 functions with left plate 120 to securely fasten helmet 100 to the animal's head. Thus, helmet 100 is customizable to the animal's head for increased fit and functionality. In this manner, the right side of the animal's face rests comfortable against right panel cushioning means 183 while right panel 150 is protected by right plate 150.

Figure 5:
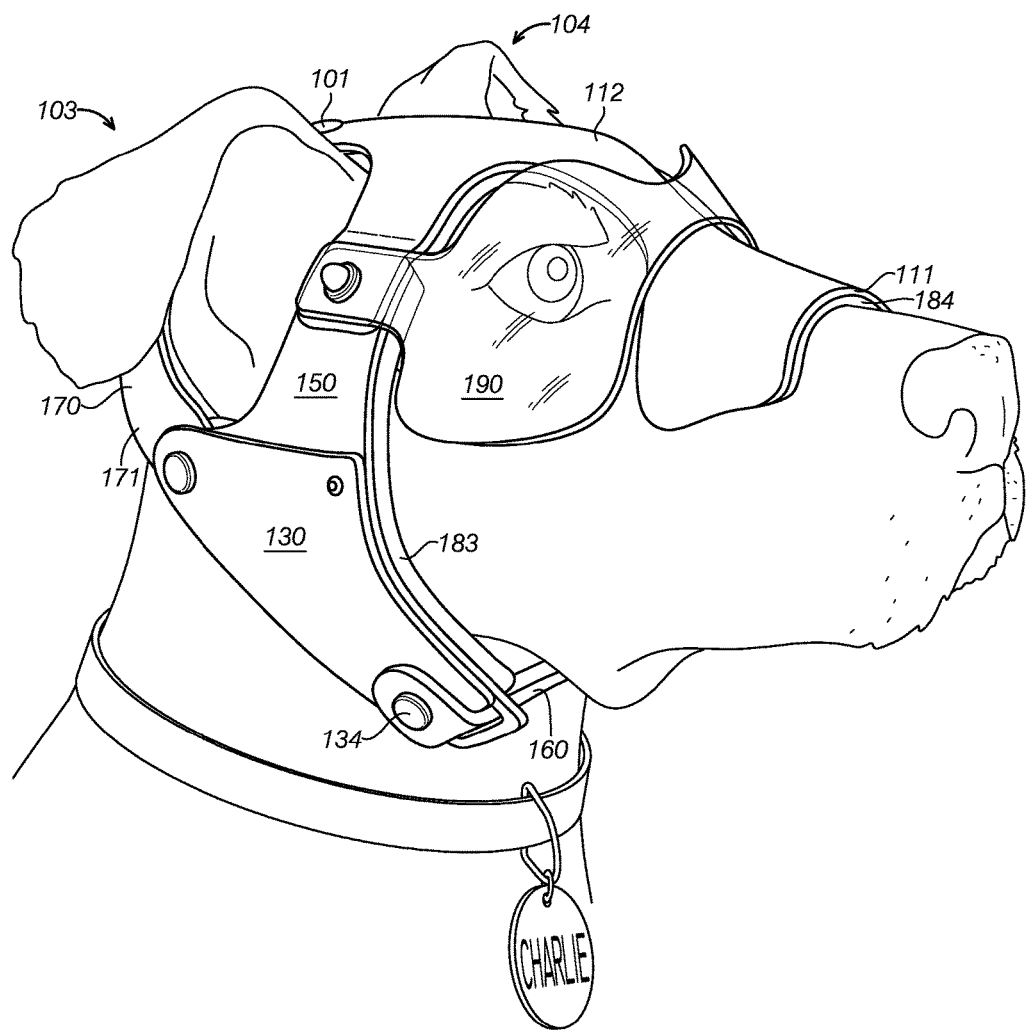
FIG. 5 is a perspective view of an embodiment of a cranial protection system as worn by an exemplary user.

Finally, FIG. 5 depicts an embodiment of helmet 100 as worn by an animal. As can be seen, when assembled, helmet 100 provides a sturdy protection system for the animal that operates out of negative space to accommodate the unique shape of the animal's head and, in particular, ear position. Thus, FIG. 5 depicts right plate 130 and right panel 150 working with rear strap right side 171 to surround the animal's right ear 103 while left plate 120 and left panel 140 work with rear strap left side 173 to surround the animal's left ear 104. Similarly, face shield 190 protects the eye area of the animal, face guard 112 protects the top of the animal's head, and nose guard 111 protects the animal's snout.

In alternative embodiments (not sown) helmet 100 may be equipped with a variety of accessories depending on the activity the animal is engaged in. For example, some embodiments may include equipment capable of sending and/or receiving audiovisual transmissions. Other embodiments, additional equipment such as oxygen masks and the like may be included. In still other embodiments, helmet 100 may include a visor.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A cranial protection system for a terrestrial animal, the cranial protection system comprising:
   a face guard;
   a pair of plates, the pair of plates comprising a left plate and a right plate;
   a pair of panels, the pair of panels comprising a left panel and a right panel;
   a front strap;
   a rear strap, wherein a rear strap is coupled to the left plate, the right plate, and the face guard; and
   a cushioning means.

2. The cranial protection system of claim 1, wherein the face guard further comprises
   a left recess having a left recess aperture;
   a right recess having a right recess aperture;
   a head guard having a head guard aperture; and
   a nose guard.

3. The cranial protection system of claim 1, wherein:
   the left plate comprises a left plate aperture and a peg; and
   the right plate comprises a right plate aperture.

4. The cranial protection system of claim 1, wherein:
   the left panel comprises a left panel slot and a left panel aperture; and
   the right panel comprises a right panel slot and a right panel aperture.

5. The cranial protection system of claim 4, wherein the front strap further comprises a left side and a right side, the right side having an aperture, wherein:
   the left side is removably threaded through the left panel slot;
   the right side is threaded through the right panel slot; and
   the aperture is removably coupled to a peg.

6. The cranial protection system of claim 1, wherein the plurality of cushioning means comprises a head guard cushioning means, a left plate cushion, a right plate cushioning means, and a nose guard cushion.

7. The cranial protection system of claim 6, wherein:
   the head guard cushioning means is affixed to the head guard;
   the nose guard cushion is affixed to the nose guard;
   the left plate cushioning means is affixed to the left plate; and
   the right plate cushioning means is affixed to the right plate.

8. The cranial protection system of claim 1, wherein:
   the left panel is attached to the left plate and wherein the left panel is also attached to the face guard; and
   the right panel is attached to the right plate and wherein the right panel is also attached to the face guard.

9. The cranial protection system of claim 1, further comprising a front shield having a left side, a right side, and a front, wherein:
   the left side of the front shield is removably coupled to the left plate;
   the right side of the front shield is removably coupled to the right plate; and
   the front of the front shield is substantially in front of the nose guard.

10. The cranial protection system of claim 1, wherein the cranial protection system is configured to send or receive a electronic audiovisual communication.

11. A cranial protection system for a terrestrial animal, the cranial protection system comprising:
    a face guard;
    a pair of plates, the pair of plates comprising a left plate and a right plate;
    a pair of panels, the pair of panels comprising a left panel and a right panel;
    a front strap;
    a rear strap;
    a cushioning means;
    a nose guard; and
    a front shield including a left side, a right side, and a front, wherein:
      the left side of the front shield is removably coupled to the left plate;
      the right side of the front shield is removably coupled to the right plate; and
      the front of the front shield is substantially in front of the nose guard.

12. The cranial protection system of claim 11, wherein:
    the face guard further comprises a head guard having a head guard aperture and a nose guard;
    the left plate comprises a left plate aperture and a peg;
    the right plate comprises a right plate aperture;
    the left panel comprises a left panel slot and a left panel aperture; and the right panel comprises a right panel slot and a right panel aperture.

13. The cranial protection system of claim 12, wherein the front strap further comprises a left side having a first aperture and a right side having a second aperture, wherein:
the left side of the front strap is removably threaded through the left panel slot;
the right side of the front strap is threaded through the right panel slot;
the first aperture or the second aperture of the front strap is removably coupled to a peg;
a rear strap is coupled to the left plate, the right plate, and the face guard; and
the cushioning means comprises a head guard cushioning means, a left plate cushion, a right plate cushion, and a nose guard cushion.

14. The cranial protection system of claim 13, wherein:
the head cushioning means is affixed to the head guard;
the nose guard cushion is affixed to the nose guard;
the left plate cushion is affixed to the left plate; and
the right plate cushion is affixed to the right plate.

15. The cranial protection system of claim 11, wherein:
the left panel is attached to the left plate and the face guard; and
the right panel is attached to the right plate and the face guard.

16. A cranial protection system for a terrestrial animal, the cranial protection system comprising:
a face guard;
a pair of plates, the pair of plates comprising a left plate and a right plate;
a pair of panels, the pair of panels comprising a left panel and a right panel;
a front strap;
a rear strap; and
a plurality of cushioning means, wherein:
the left panel, the rear strap, and the right panel are affixed to the face guard;
the rear strap is affixed to the face guard, left plate, and the right plate; and
the front strap is removably connected to the left plate and the plate.

17. The cranial protection system of claim 16, further comprising side panels to enable lateral movement between the pair of plates.

* * * * *